United States Patent [19]

Hodlewsky et al.

[11] Patent Number: 4,765,454
[45] Date of Patent: * Aug. 23, 1988

[54] CONVEYOR CHAIN FOR USE WITH FINGERED TRANSFER PLATE

[75] Inventors: Wasyly G. Hodlewsky, Greendale; Roger H. Schroeder, Hartland, both of Wis.

[73] Assignee: Rexnord Inc., Brookfield, Wis.

[*] Notice: The portion of the term of this patent subsequent to Mar. 27, 2001 has been disclaimed.

[21] Appl. No.: 764,817

[22] Filed: Aug. 12, 1985

Related U.S. Application Data

[60] Continuation of Ser. No. 589,925, Mar. 15, 1984, abandoned, which is a division of Ser. No. 259,616, May 1, 1981, Pat. No. 4,438,838.

[51] Int. Cl.⁴ .............................................. B62G 17/08
[52] U.S. Cl. ..................................... 198/635; 198/853
[58] Field of Search ............................... 198/850–853, 198/635

[56] References Cited

U.S. PATENT DOCUMENTS

| | | |
|---|---|---|
| 2,237,345 | 4/1941 | Frentzel, Jr. et al. ......... 198/635 X |
| 3,107,777 | 10/1963 | Steorts, Jr. ..................... 198/852 |
| 3,865,229 | 2/1975 | Velander ..................... 198/850 X |
| 4,050,323 | 9/1977 | I'Anson ............................ 198/853 |
| 4,051,949 | 10/1977 | Lapeyre .......................... 198/853 |
| 4,138,011 | 2/1979 | Lapeyre ..................... 198/853 X |
| 4,153,152 | 5/1979 | Lapeyre .......................... 198/851 |
| 4,171,045 | 10/1979 | Lapeyre .......................... 198/635 |
| 4,394,901 | 6/1983 | Roinestad ....................... 198/850 |

Primary Examiner—Robert J. Spar
Assistant Examiner—Lyle K. Kimms
Attorney, Agent, or Firm—Michael, Best & Friedrich

[57] ABSTRACT

The present invention provides a chain link for use with a fingered transfer plate. The link comprises a base portion and a raised portion integral with and supported by the base portion. The raised portion includes a plurality of coplanar fork-shaped members, each of the fork-shaped members comprising two prongs and a stem, wherein the prongs of each fork-shaped member are parallel to each other and the width of the stem is less than the distance between the prongs, the fork-shaped members being arranged in a regularly spaced row.

7 Claims, 4 Drawing Sheets

CONVEYOR CHAIN FOR USE WITH FINGERED TRANSFER PLATE

This application is a continuation of application Ser. No. 589,925, filed Mar. 15, 1984, now abandoned, which is a division of application Ser. No. 259,616, filed May 1, 1981, now U.S. Pat. No. 4,438,838.

BACKGROUND OF THE INVENTION

This invention relates to conveyor chain links and, more particularly, to chain links adapted for use with a fingered transfer plate.

Typically, when a flat plate chain is used in conjunction with a transfer plate, there is a gap between the chain and the transfer plate. This gap may cause articles being carried on the top surface of the chain to tip or hang up at the point of transfer. A fingered transfer plate has been used in the past as a solution to this problem. U.S. Pat. No. 4,051,949, hereby incorporated by reference, hereinafter referred to as the Lapeyre patent, illustrates a conveyor system using such a fingered transfer plate. The Lapeyre patent refers to problems with this type of chain, such as kick-up due to the chordal effect, and provides methods for minimizing some of the problems. There are, however, several other problems with this type of chain which the Lapeyre patent does not address.

For example, it is desirable to make this type of chain so that it may be driven by a sprocket having fairly wide teeth for handling large loads. At the same time, while it is necessary that there be discontinuities along the width of the top surface of the chain so that the chain may mesh with a fingered transfer plate, it is important that those discontinuities not be large enough to permit the articles being carried on the chain to tip over. The links shown in the Lapeyre patent seem to be meant to form a belt which would be driven by a drum, rather than a chain to be driven by sprockets, but it is clear that if a sprocket were to be used with the Layeyre type of chain, the sprocket teeth could never be wider than the width of the discontinuities in the top surface of the chain. Thus, in order to use a wide-toothed sprocket with the links shown in the Lapeyre patent, it would also be necessary to have wide discontinuities in the top surface of the chain.

One object of the present invention is to provide a chain which may be used with a fingered transfer plate. Another object is to provide a chain having barrels which may be driven by sprocket teeth. Another object of the present invention is to provide a chain with sufficient strength to withstand substantial loads. Another object of the present invention is to provide a chain which has the capability of back-flexing. Another object of the present invention is to provide a chain with sufficient open area for drainage and air flow through the chain. These and other objects will be apparent to one skilled in the art upon reading the Description of the Preferred Embodiments.

SUMMARY OF THE INVENTION:

The present invention provides a chain link for use with a fingered transfer plate. The link comprises a base portion and a raised portion integral with and supported by the base portion. The raised portion includes a plurality of coplanar fork-shaped members, each of the fork-shaped members comprising two prongs and a stem, wherein the prongs of each fork-shaped member are parallel to each other and the width of the stem is less than the distance between the prongs, the fork-shaped members being arranged in a regularly spaced row.

Figure 1:
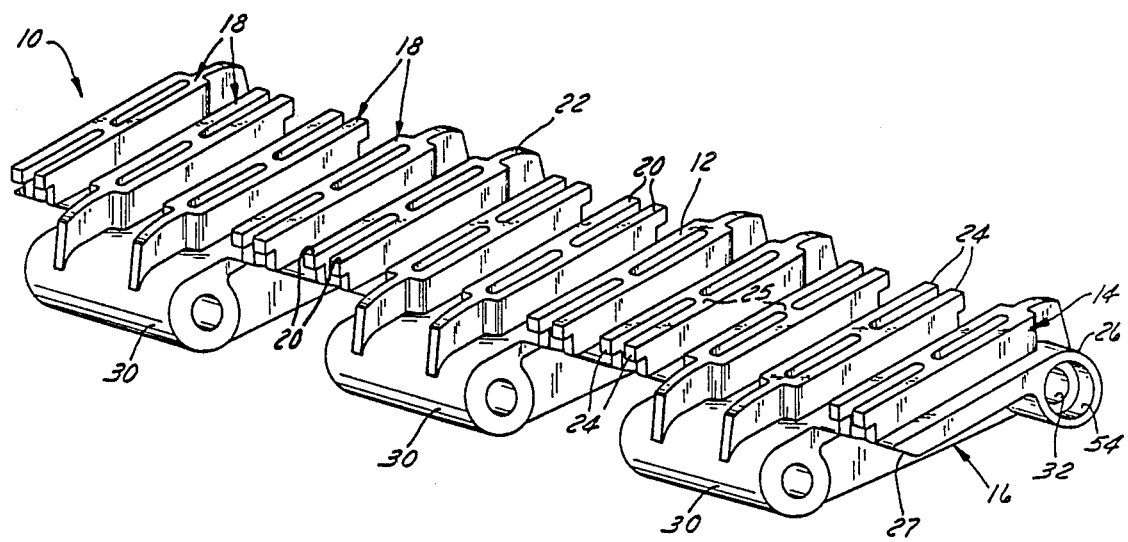
FIG. 1 is a perspective view of the top of a link made in accordance with the present invention.
Figure 5:
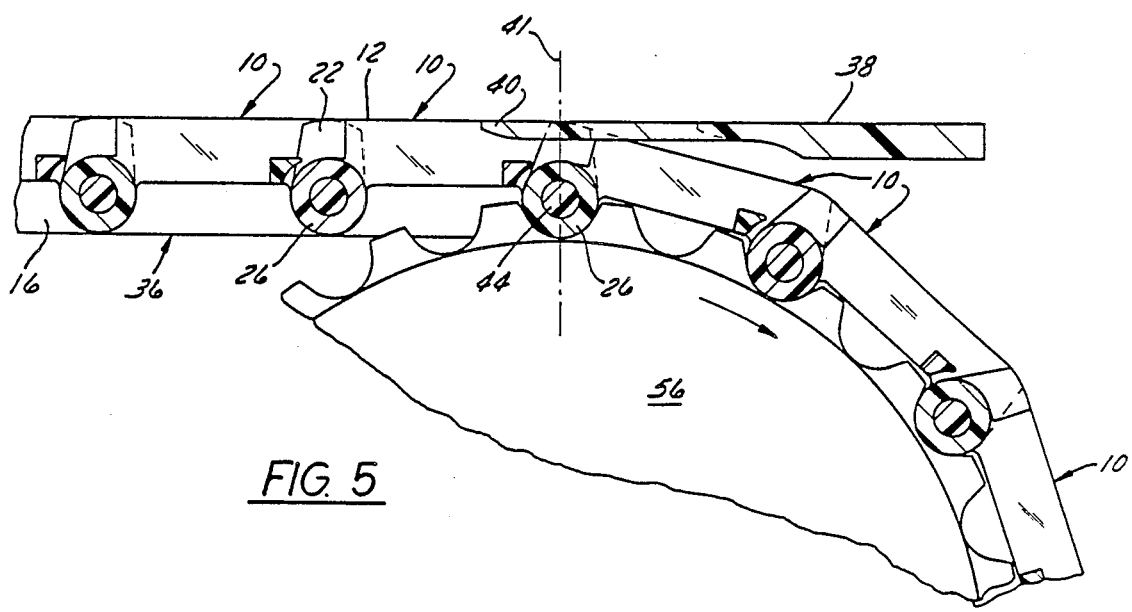
FIG. 5 is a broken-away side sectional view taken along Section Y—Y of FIG. 3, and including a sprocket.

DESCRIPTION OF THE PREFERRED EMBODIMENTS:

FIG. 1 is a perspective veiw of a link 10 made in accordance with the present invention and showing the top surface 12 of link 10. Link 10 includes a raised portion 14 and a base portion 16. Link 10 is made of a molded polymeric material, and raised portion 14 and base portion 16 are integral parts of the molded link 10. Raised portion 14 is made up of several coplanar fork-shaped members 18 which are arranged in a regularly spaced row supported by base portion 16. Each fork-shaped member 18 includes two prongs 20 and a stem 22. The prongs 20 of each fork-shaped member 18 are parallel to each other and the width of stem 22 is less than the distance between prongs 20 such that the stem 22 of a fork-shaped member 18 on one link 10 will fit between the legs 20 of the adjacent fork-shaped member 18 on the adjacent link 10. The top surface 12 of stems 22 is curved so as to provide a smooth top surface 12 when links 10 curve around a sprocket as shown in FIG. 5. The ends 24 of prongs 20 are cut away at the bottom in order to permit back-flexing of the links. It will be seen more clearly in FIG. 5 that ends 24 of prongs 20 do not extend past the centerline of barrels 26, 30, while stems 22 do extend past the centerline of barrels 26, 30. The stems 22 blend into and are supported on the barrel 26, 30, and the ends of the stems 22 lie in a plane which is tangent to the outermost edge of the barrels 26, 30. Cross-members 25 are provided in each fork-shaped member 18, extending between and connecting prongs 20 approximately at their midpoints to give added strength to link 10.

Figure 2:
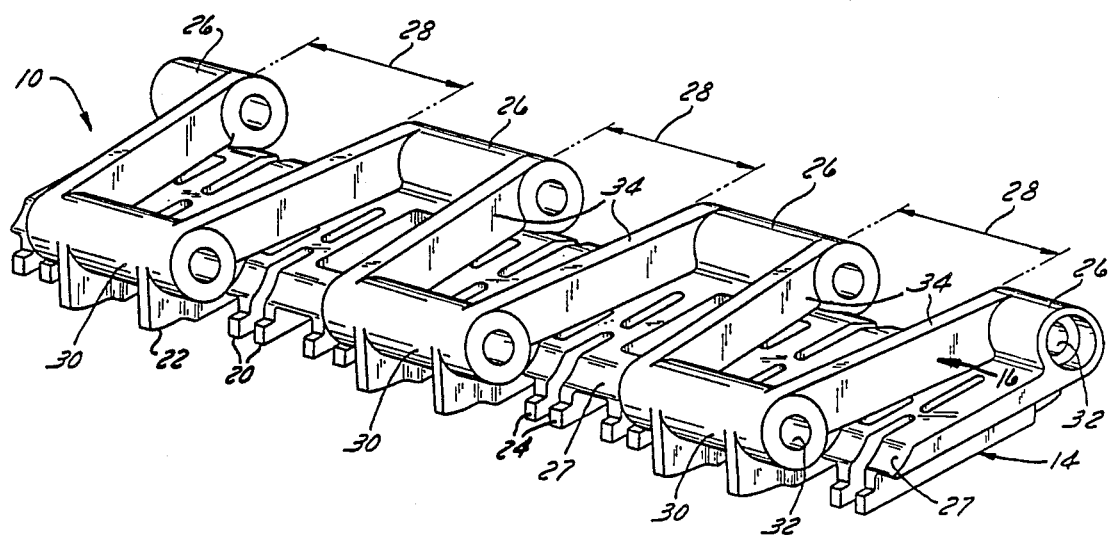
FIG. 2 is a perspective view of the bottom of the link shown in FIG. 1.

FIG. 2 is a perspective view of the bottom side of link 10 shown in FIG. 1 and gives a better view of base portion 16. First hollow barrels 26 are axially aligned, with spaces 28 between barrels 26. Second hollow barrels 30 are axially aligned, and the axis of barrels 30 is parallel to the axis of barrels 26 such that barrels 30 are positioned opposite spaces 28. All barrels 26 and 30 have apertures 32 through them to permit the insertion of a pin, and the outermost barrels 26 have apertures 32 which are recessed, so that the heads of the pins which connect the links may be recessed. It should be noted that the outermost barrels 26 are in line with the edge of the raised portion 14, so that the link provides smooth, straight sides for smooth interaction with the conveyor frame. Reach bars 34 interconnect barrels 26 and 30 and serve to strengthen link 10. Reach bars 34 also assist in tracking the chain by preventing excessive lateral movement over the sprockets. Each reach bar 34 has one end attached to a barrel 26 and the other end attached to a barrel 30. Arcs 27 are provided for close hinge design without hinge interference and to avoid trapping of material, in accordance with the teaching of U.S. Pat. No. 2,911,091, which is hereby incorporated by reference.

Figure 3:
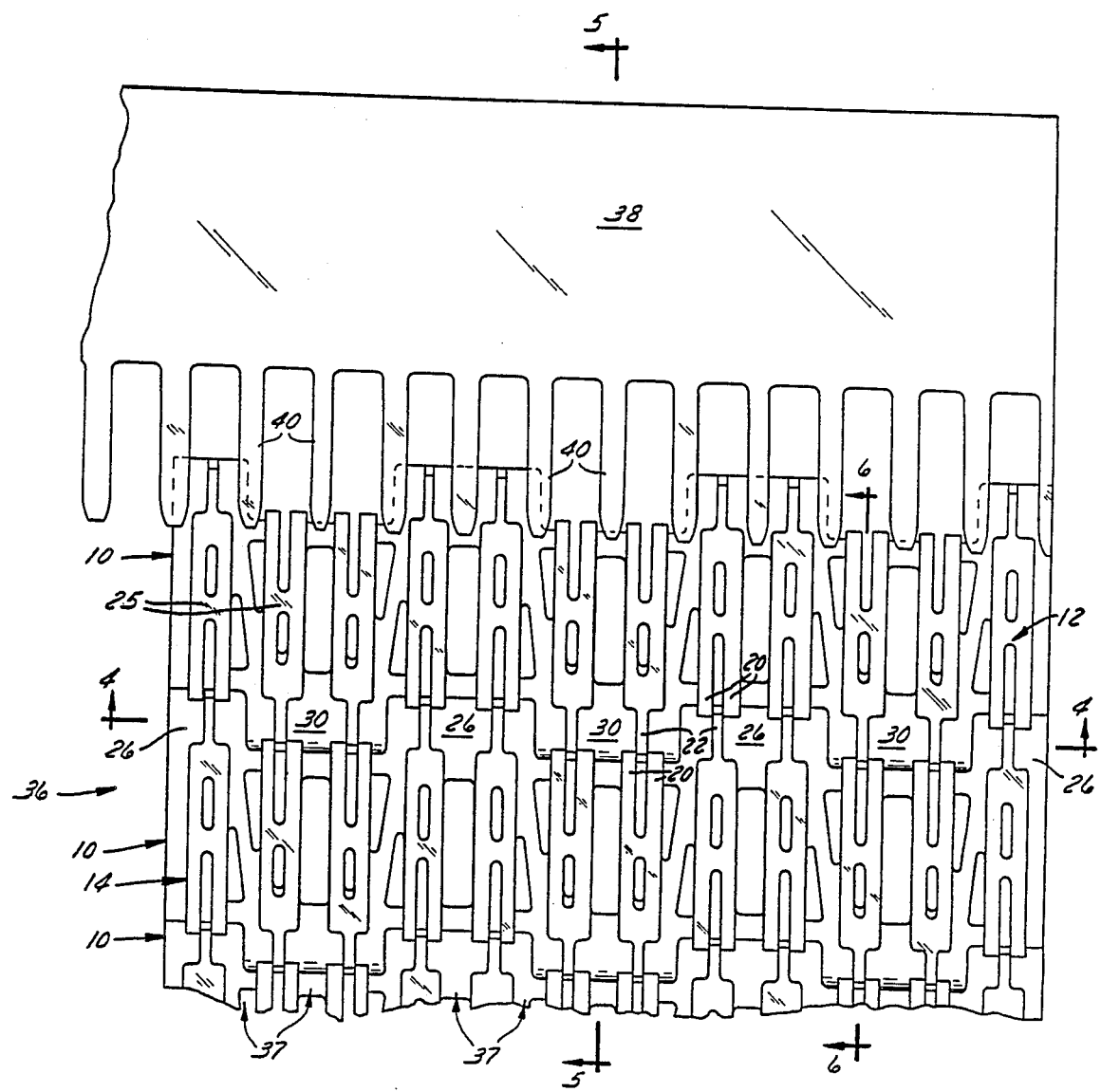
FIG. 3 is a top broken-away view of a chain and a fingered transfer plate, the chain being made of the links shown in FIG. 1.

FIG. 3 shows a chain 36 made up of links 10. Chain 36 is designed so that it has sufficient open area for applications in which air or water is expected to flow through the chain. Preferably, the open area is at least thirty percent. When the links 10 are assembled, barrels 30 of one link 10 fit into the spaces 28 between barrels 26 of the next link 10. The resulting chain 36 provides a series of lengthwise, straight-tracking strips along its top surface 12, as stems 22 of one link 10 fit between prongs 20 on the adjacent link. It also provides lengthwise slots 37 alnog raised portions 14, which are adapted to received fingers 40 of fingered transfer plate 38. When chain 36 back-flexes, stem 22 of one fork-shaped member 18 will move further into the space between prongs 20 of the adjacent fork-shaped member 18 on the adjacent link 10. Chain 36 is designed to have a maximum back-flex radius of about six inches. It will be seen more clearly in later figures that base portion 16 is on a lower plane than fork-shaped members 18 and therefore does not interfere with fingers 40.

Figure 4:
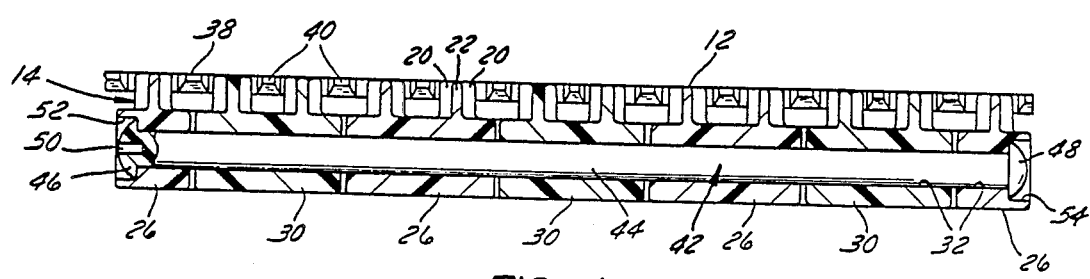
FIG. 4 is a cross-sectional view of the chain and fingered transfer plate taken along Section X—X of FIG. 3, including a view of a pin.
Figure 7:
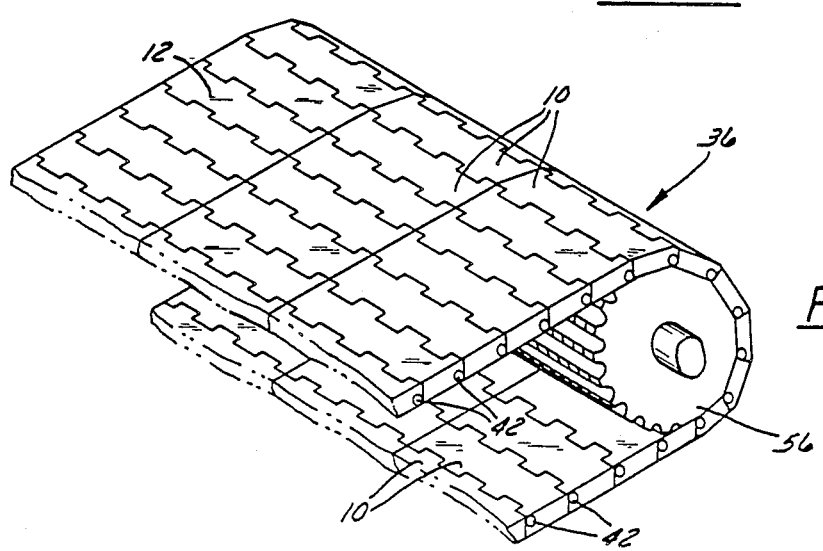
FIG. 7 is a schematic drawing showing a chain made up of the links shown in FIG. 1.

FIG. 4 is a cross-sectional view of FIG. 3 at the intersection of links 10. Pin 42 has been inserted through apertures 32 in barrels 26 and 30 in order to connect links 10. Pin 42 is made up of a shank portion 44 with head 46 at one end of shank 44 and head 48 at the other end. In this embodiment, pin 42 is made of a thermoplastic resin. Before pin 42 is inserted into aperture 32, pin 42 includes only head 48 and shank 44. When chain 36 is being assembled, barrels 30 of one link are inserted into spaces 28 between barrels 26 of the adjacent link, and shank 44 is inserted into apertures 32 until head 48 is recessed into receptacle 54 of outermost barrel 26. Then, head 46 is ultrasonically formed in place so that it is recessed into receptacle 52. Other methods of forming the head could also be used. The result is a pin 42 with heads 46 and 48, which are recessed into receptacles 52, 54 of the outermost barrels 26. The advantages of recessing pin heads 46, 48 include, first, that heads 46, 48 do not wear off by rubbing on adjacent supporting members of the conveyor. Second, several chains 36 can be butted side by side to form a wider conveyor chain without interference of pin heads, and without increasing the gap between adjacent fork-shaped members 18 as shown in FIG. 7. A dimple 50 is provided in the center of the outer surface of head 46. There is a similar dimple 50 in head 48 which cannot be seen in this FIG. For removal of pin 42, dimple 50 is used as a means for centering a drill bit. It is then a simple procedure to drill out head 46 and then drive pin 42 out toward head 48. If one desires to prevent pin rotation and thereby reduce joint wear, it is possible to provide pin 44 with heads 46 and 48 having square, hexagonal, or other cross section and to provide receptacles 52 and 54 with similar cross sections so that heads 46 and 48 are prevented from rotating.

FIG. 5 is a broken-away side sectional view of a conveyor including chain 36, fingered transfer plate 38 and sprocket 56. Top surface 12 of chain 36 is in the same plane as the top surface of fingered transfer plate 38. As sprocket 56 rotates in a clockwise direction, articles being carried on top surface 12 of chain 36 are transferred onto fingered transfer plate 38. Fingers 40 of fingered transfer plate 38 project beyond centerline 41 of the barrel 26 which is in contact with sprocket 56 so that the articles being carried by chain 36 are transferred onto fingered transfer plate 38 before chain 36 begins to bend around sprocket 56. In can be seen that sprocket 56 drives chain 36 by contacting barrels 26, 30. It can be seen more clearly in FIG. 5 that base portion 16 is lower than fingers 40 and therefore does not interfere with fingers 40. As chain 36 curves around sprocket 56, it can also be seen that kick-up is prevented. The way in which kick-up is prevented is as follows. First, prongs 20 do not extend beyond centerline 41 of barrels 26, 30, so that prongs 20 follow barrels 26, 30 around sprocket 56 without kicking up. Second, stems 22, which do extend beyond centerline 41, have a top surface which is curved so as to follow the curvature of sprocket 56. This avoids the problem of kick-up which would be present if stems 22 were flat on top.

Figure 6:
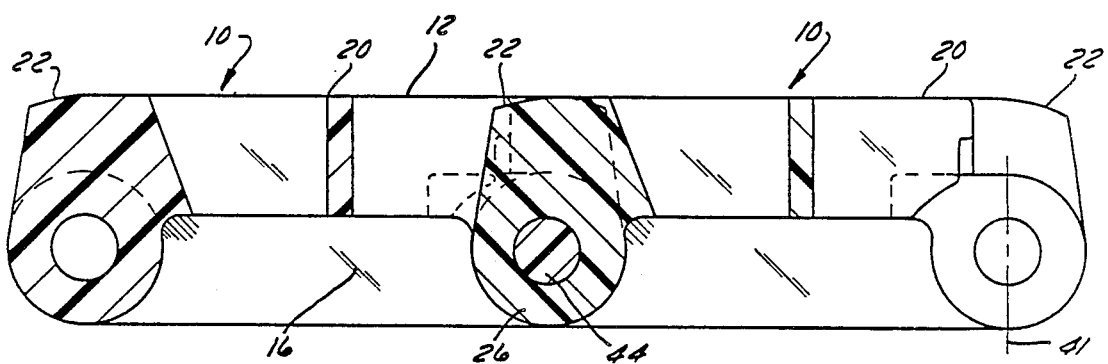
FIG. 6 is a side sectional view taken along Section Z—Z of FIG. 3.

FIG. 6 is a side sectional view of chain 36 shown in FIG. 3 and illustrates the details of links 10 a bit more clearly than does FIG. 5.

FIG. 7 is a schematic drawing which shows that links 10 may be connected widthwise as well as lengthwise in order to form a wide chain. Because heads 46 and 48 are recessed, it is not cecessary that every pin 42 extend through all three widths. Instead, it is possible simply to butt the three widths together and have all short pins 42 or, alternatively, to use mostly short pins 42 with an occasional long pin extending through all three widths.

Figure 8:
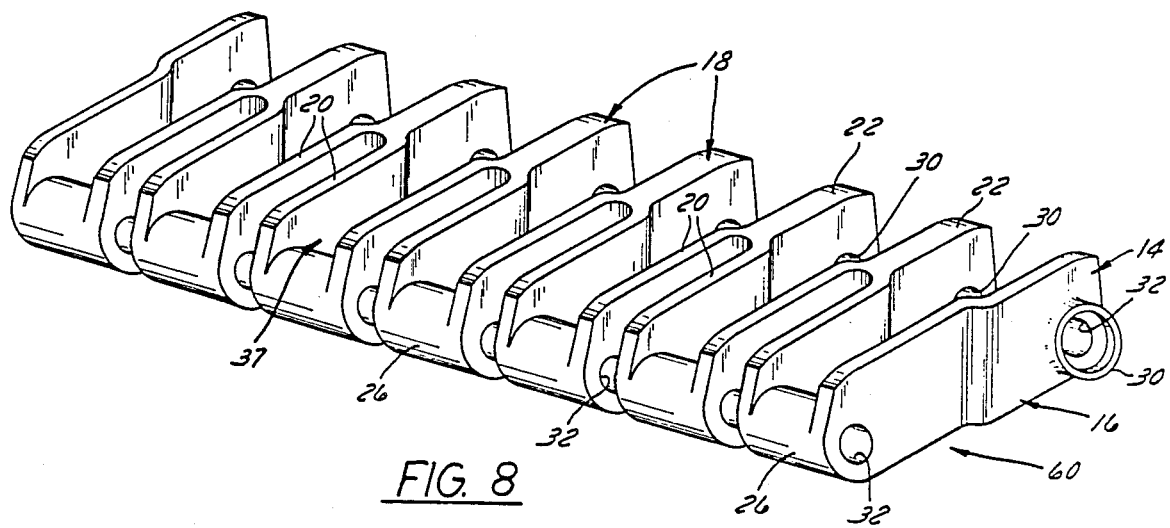
FIG. 8 is a perspective view of a second embodiment of a link made in accordance with the present invention.

FIG. 8 shows a link 60 made in accordance with the present invention. Again, link 60 has a raised portion 14 and a base portion 16. Base portion 16 includes barrels 26 and 30 which have apertures 32 through them for receiving a pin. Again, raised portion 14 is made up of fork-shaped members 18. Fork-shaped members 18 have prongs 20 and stems 22. In this embodiment, fork-shaped members 18 extend into base portion 16 to serve the function of reach bars.

Figure 9:
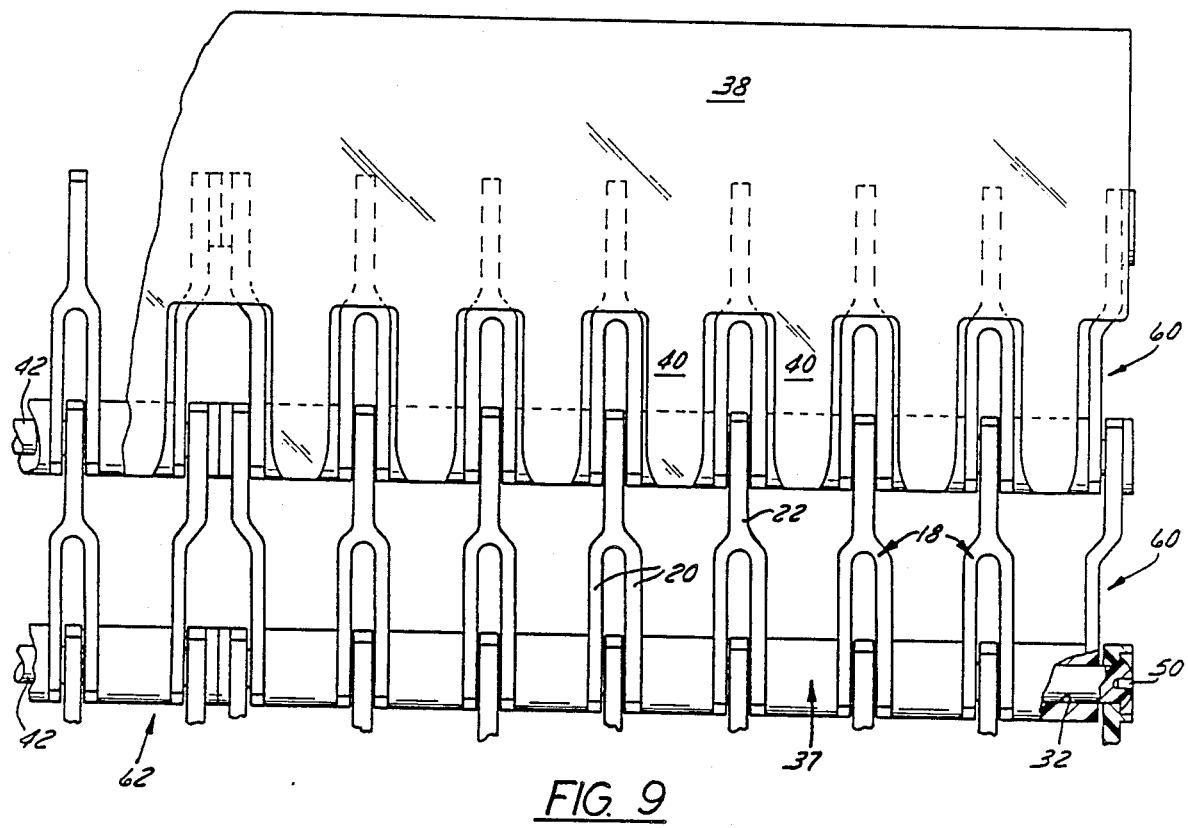
FIG. 9 is a top, broken-away view of a chain and fingered transfer plate, the chain being made of the links shown in FIG. 8.

FIG. 9 shows links 60 connected together in a chain 62. Stems 22 of fork-shaped members 18 on one link fit between the prongs 20 of adjacent fork-shaped members 18 on the next link 60. This permits the axis of barrels 30 to line up with the axis of barrels 26 so that a pin 42 may be inserted through apertures 32. Fingers 40 of fingered transfer plate 38 fit into the slots 37 between fork-shaped members 18.

Various other embodiments of this invention could be imagined, such as a chain link similar to the link in FIG. 1 in which more fork-shaped members 18 are squeezed together on the same base portion 16. Braces could be added; other types of pins could be used, such as metal pins held in place with snap rings or other pins known in the art; and so forth. These and other variations and combinations are contemplated by the present invention and should be obvious to one skilled in the art.

What is claimed is:

1. A chain, comprising:

a plurality of links, each link including:

a raised portion having a plurality of coplanar fork-shaped members, each of said fork-shaped member comprising two prongs and a stem, wherein the prongs of each fork-shaped member are parallel to each other and the width of said stem is less than the distance between said prongs, said fork-shaped members being arranged in a regularly spaced row such that fingers of a fingered transfer plate may fit between said fork-shaped members;

a base portion integral with and supporting said raised portion, said base portion including:

at least two first hollow barrels, said first barrels being axially aligned and having a space between them, wherein the axis of said first barrels is approximately perpendicular to the prongs and stems of said fork-shaped members;

at least one second barrel, the axis of said second barrel being radially spaced from and parallel to the axis of said first barrels, such that said second barrel is positioned opposite the space between said first barrels; and two reach bars, each reach bar having first and second ends, wherein the first end of one of said reach bars is attached to one of said first barrels, the first end of the other reach bar is attached to the other first barrel, and the second ends of both reach bars are attached to said second barrel; and a plurality of pins, each pin extending through the first hollow barrels of one link and the second hollow barrels of the adjacent link, thereby joining adjacent links, each of said pins comprising a shank portion having two ends, and including heads at both ends, said heads being recessed in the outermost barrels; at least one of said heads having a dimple in the center of its outer surface;

wherein said links are attached such that the stems of one link are aligned between the prongs of the adjacent fork-shaped members of the next link and wherein said link provides straight sides for smooth interaction with a conveyor frame.

2. The chain recited in claim 1, in combination with:

a sprocket including teeth which mesh with said barrels so as to drive said chain; and a fingered transfer plate including fingers which fit between said fork-shaped members, wherein the top surface of said fingered transfer plate is approximately coplanar with the top surface of said fork-shaped members.

3. The chain as recited in claim 1 wherein said plurality of links when connected together provide a substantially uninterrupted smooth straight side surface.

4. A chain link, comprising:

a base portion; and a raised portion integral with and supported by said base portion, said raised portion including a plurality of coplanar fork-shaped members, each of said fork-shaped members comprising two spaced apart prongs and a stem, wherein the prongs of each fork-shaped member are parallel to each other and to the prongs of the other fork-shaped members and the width of said stem is less than the distance between said prongs, said fork-shaped members being arranged in a regularly-spaced row such that fingers of a fingered transfer plate may be received between said fork-shaped members.

5. A chain link comprising a base portion, and a plurality of fork-shaped member integral with, supported by and extending upwardly from said base portion, said fork-shaped members being spaced apart so that adjacent fork-shaped members define therebetween a slot through which a finger of a fingered transfer plate may pass, and said fork-shaped member each comprising two spaced apart prongs and a stem.

6. The chain as recited in claim 5 wherein the fork-shaped members are arranged in a regularly-spaced row such that the fingers of a fingered transfer plate may be recieved between said fork-shaped members.

7. A chain link as set forth in claim 5 wherein the width of said stem is less than the distance between said prongs.

* * * * *